(12) United States Patent
Bachus

(10) Patent No.: US 10,034,438 B2
(45) Date of Patent: *Jul. 31, 2018

(54) SYSTEMS AND METHODS FOR SYMMETRICAL DRIP MESH

(71) Applicant: Chad McHugh Bachus, Austin, TX (US)

(72) Inventor: Chad McHugh Bachus, Austin, TX (US)

(73) Assignee: Stone Oak Land Design LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/441,425

(22) Filed: Feb. 24, 2017

(65) Prior Publication Data

US 2017/0156272 A1 Jun. 8, 2017

Related U.S. Application Data

(63) Continuation of application No. 14/664,972, filed on Mar. 23, 2015, now Pat. No. 9,615,516.

(51) Int. Cl.

| | |
|---|---|
| *B05B 17/00* | (2006.01) |
| *A01G 25/02* | (2006.01) |
| *B05B 1/20* | (2006.01) |
| *B05B 1/30* | (2006.01) |
| *F16L 41/02* | (2006.01) |
| *A01G 25/00* | (2006.01) |
| *B05B 1/14* | (2006.01) |

(52) U.S. Cl.
CPC ............ *A01G 25/02* (2013.01); *A01G 25/00* (2013.01); *A01G 25/023* (2013.01); *B05B 1/14* (2013.01); *B05B 1/20* (2013.01); *B05B 1/30* (2013.01); *F16L 41/021* (2013.01); *F16L 41/023* (2013.01)

(58) Field of Classification Search
CPC ...... A01G 25/02; A01G 25/00; A01G 25/023; F16L 41/021; F16L 41/023; B05B 15/06; B05B 1/20; B05B 15/061; B05B 15/063; B05B 1/14; B05B 1/30
USPC ....... 239/145, 200, 207, 266–269, 273, 275, 239/276, 279, 542, 547, 565, 1; 285/130.1, 131.1, 132.1
See application file for complete search history.

(56) References Cited

U.S. PATENT DOCUMENTS

| | | | | |
|---|---|---|---|---|
| 3,518,831 A | * | 7/1970 | Tibbals, Jr. et al. | ... A01G 25/06 239/542 |
| 3,957,292 A | * | 5/1976 | Diggs | ................... A01G 25/023 285/130.1 |
| 4,065,926 A | * | 1/1978 | Brandt | .................... E02B 13/00 239/207 |

(Continued)

*Primary Examiner* — Steven J Ganey

(57) ABSTRACT

Embodiments disclosed herein describe systems and methods for a drip irrigation system with triangulated drip emitters configured to uniformly distribute wetting patterns. The drip irrigation system may be wrapped with a protective filter fabric for the length of the distribution line prolonging the life of the distribution lines and emitters by preventing soil and root intrusion and protecting the drip tubing from abrasions, cuts, or pinching. The drip irrigation system may be a unified device that is configured to be rolled, placed, positioned, etc. over a desired area, wherein the drip irrigation system may be coupled to a single water inlet and output water at a plurality of uniformly distributed drip emitters.

20 Claims, 8 Drawing Sheets

(56) References Cited

U.S. PATENT DOCUMENTS

| | | | | |
|---|---|---|---|---|
| 7,896,261 B2* | 3/2011 | Holmes | ............... | F16L 41/021 239/565 |
| 7,913,935 B2* | 3/2011 | Einav | .................. | A01G 25/02 239/547 |
| 9,016,311 B2* | 4/2015 | Lee | ..................... | F16L 41/023 285/131.1 |

* cited by examiner

SYSTEMS AND METHODS FOR SYMMETRICAL DRIP MESH

BACKGROUND INFORMATION

Field of the Disclosure

Examples of the present disclosure are related to systems and methods for irrigation systems. More particularly, embodiments relate to a drip mesh irrigation system having uniform wetting patterns.

Background

Conventional drip irrigation systems connect to a source of water, and distribute a controlled quantity of the water through a distribution line. A conventional drip irrigation system has multiple distribution lines, wherein each distribution line distributes water to different plant species through drip emitters.

Typically, distribution lines are linear tubes, with inlets and a plurality of drip emitters. Conventionally, the distribution lines are laid out in a parallel manner, wherein each distribution line is parallel to every other distribution line. The drip emitters are positioned at predetermined intervals along the distribution line.

However, the parallel layout of distribution lines within conventional drip irrigation systems does not create uniform wetting patterns. This may be caused by the overlapping or lack of overlapping of certain wetting patterns due to the non-uniform distribution of water from a plurality of drip emitters unequally spaced. Furthermore, the non-uniform wetting patterns may be caused by human error and the inability of an installer to correctly align the drip lines and plants in a uniform fashion. Accordingly, plants positioned in different locations may receive more or less water than other plants. When the plants' center spacing dimension is less than the drip emitter spacing, the plants closest to the drip emitters may get sufficient water for establishment and sustainability, while the plants furthest from drip emitters weaken. This may give rise to disease and pests, or even death of the plants from lack of sufficient water to maintain vigor due to the interference of water by adjacent plants closer to the drip emitters.

In conventional drip irrigation methods, drier areas are sometimes created from uneven distribution of drip emitters in an irrigated area. When drier areas are created, the irrigation zone run time may need to be increased beyond the water requirements of a proportion of the plant material within the irrigated planting area in order to get sufficient water to those drier areas through percolation. This over saturation to a proportion of the irrigated area can give rise to fungus, pests, and even suffocation of plant material from lack of available oxygen in soil. Thus, the uneven distribution of water in conventional drip irrigation layouts causes fluctuations in plant performance within a drip irrigated area. Furthermore, the task to correctly align the placement of plants with drip emitters is an arduous task, which can be very time consuming. Thus, current drip irrigation systems are inefficient systems to provide water and other nutrients to plants.

In addition to poor distribution of precipitation, lack of a filter at drip emitters gives rise to soil and root intrusion, which causes the drip emitter and sometimes even the drip tubing to fail. This intrusion causes the distribution lines and emitters to clog. Soil intrusion occurs when soil particles, such as sand, silt, or clay move in to the drip line via the drip emitter openings due to back pressure in the irrigation system, back siphonage in the irrigation system, and soil movement through compaction and settling. Root intrusion occurs when actively growing root cells spread into a drip emitter. Both soil and root intrusion can clog the drip emitter and the drip tubing.

Traditional drip distribution lines have a low resilience to cuts, abrasion, and pinching. This low resilience makes drip lines vulnerable to failure due from the absence of a protective, reinforcing shell or barrier that could increase the abrasion resistance and rigidness of the drip tubing.

Accordingly, needs exist for more effective and efficient systems and methods for drip irrigation systems with triangulated drip emitters with a soil/root filter fabric barrier, wherein the triangulated drip emitters are configured to uniformly distribute wetting patterns to more precisely achieve a uniform saturation of soil and reduce water waste, while preventing soil and/or root intrusion, cuts, abrasion, pinching, thus prolonging the life of the distribution lines.

SUMMARY

Embodiments disclosed herein describe systems and methods for drip irrigation systems with triangulated drip emitters with a filter fabric barrier. The triangulated drip emitters may be configured to uniformly distribute wetting patterns. The drip irrigation systems may be coupled to a water source, such as an underground watering system or an above ground hose. Accordingly, the drip irrigation systems may be utilized for plant beds, turf areas, and/or other plant materials requiring water.

The drip irrigation system may be comprised of a plurality of drip lines that form a mesh layout. The mesh layout may be utilized as a planting guideline, template, guide, etc. in plant beds with mass planting spreads. The drip lines may be aligned at predetermined angles that intersect with another. The spacing of the triangulating drip emitters may be congruent with the plant placement for ease and accuracy of installation. This method of installing plant material equal to emitter spacing may also reduce plant interference and evenly satisfy the water requirements on all plants simultaneously. Based on the patterned layout of the drip lines, a uniform and triangulated mesh may be created to assist with even distribution of plant placement. In embodiments, a first drip line may be configured to intersect with a second set of drip lines. A first set of vertical angles formed by the intersection of a first drip line and a second drip line may be acute angles, and a second set of vertical angles formed by the intersection of the first drip line and the second drip line may be obtuse angles.

In embodiments, the first set of angles and the second set of angles may be complementary angles, wherein the first set of vertical angles may be half that of the second set of vertical angles. For example, in an embodiment, the first set of vertical angles may be sixty degrees, and the second set of vertical angles may be one hundred twenty degrees.

In embodiments, drip emitters may be positioned at the intersections of the drip lines or along mid sections between intersections. The drip emitters may be positioned to from equilateral triangles. Because the triangulation of the drip emitters, the drip emitters may be positioned at equal distances from one another, which may create uniform wetting patterns. Thus, the triangulated drip emitters may reduce the need for over watering a proportion of the area associated with the drip irrigation zone. Each individual wetting pattern will simultaneously reach all five of their adjacent emitters at the same time, given the soil texture is uniform throughout. Having all wetting patterns evenly distributed may reduce the need to over water an irrigation zone in order to get sufficient water to the drier areas often associated with conventional drip layouts.

In embodiments, the drip emitters may be pressure compensating drip emitters. The pressure compensating drip emitters may output a precise amount of water regardless in charges in water pressure due to longer drip lines or changes in terrain. The pressure compensating drip emitters may include a flexible diaphragm that regulates the water flow through the drip emitter. Because of the placement of the drip emitters and the regulated amount of distributed water, the drip emitters may distribute uniform wetting patterns. The uniform wetting patterns may assist in satisfying water requirements of the plant material.

In embodiments, a first drip line may be configured to intersect with plastic connectors instead of a second drip line. By interesting the first set of drip lines with sets of plastic connectors, the amount of drip line user may be reduced. The plastic connectors may be configured to reinforce the drip mesh and maintain the triangulation of the irrigation system.

Embodiments may be configured to increase precipitation uniformity by having each drip emitter equally spaced from a center area between sets of drip lines. Embodiments may decrease run off and reduce water usage while acting as a guide for gardeners to install plant material. Additionally, the triangulated drip mesh may decrease labor efforts during the installation process for planned beds with mass plantings. Instead of laying individual drip lines parallel with one another across a specific area to be irrigated, the triangulated drip mesh may be rolled or positioned over larger areas, with each row of the triangulated drip mesh being configured to couple with another row or extension of a row of triangulated drip mesh. This may allow an installer to cover more surface area at a more efficient pace.

Because both soil and root intrusion can clog the drip emitter and the drip tubing, which may prevent emitters from discharging water. Synthetic filter fabric, made from synthetic fibers, may be positioned at each drip emitter. The synthetic filter fabric may help prevent soil and root intrusion. In embodiments, the synthetic filter fabric may be wrapped around the drip line for the length of the entire drip line or only the drip emitters, to encompass the drip line. The synthetic filter fabric may be made up of synthetic fibers, such as Nylon, Aramid, or other synthetic fibers deemed more suitable for this application by a fiber specialist, which may allow water to pass through, but not soil particles or actively growing roots. Therefore, pores created through the weaving of the Nylon fibers may be large enough for pressurized water molecules to pass through. Yet, the pores may be small enough to prevent, limit, or reduce silt, sand, and clay particles, along with roots from passing through the pores. To this end, the synthetic filter fabric may prolong the life of the drip irrigation system by preventing clogged emitters and drip tubing.

The filter fabric may also be used to form a protective shell around the drip tubing for the entire length of the drip tubing, prolonging the life of the drip tubing by increasing the drip tubing's abrasion resistance and rigidness. Reinforcement fabric fibers, such as Nylon, or Aramid with increased denier, or Kevlar are woven into the nylon filter fabric making the drip tubing more resistant to cuts, abrasions, and pinching. The reinforced filter fabric acts as both a filter prohibiting root and soil intrusion, and also as a protective shield prolonging the life of the drip tubing by increasing its abrasion resistance and rigidness.

In embodiments, the synthetic filter fabric may be configured to cover the drip emitter at a depressed curvature in a drip line, wherein the drip emitter may be positioned at the valley of the depressed curvature. The synthetic filter fabric may be configured to wrap around the drip line, such that the filter fabric has substantially the same circumference as the drip line, wherein the circumference caused by the depressed curvature may be less than the circumference of the drip line.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
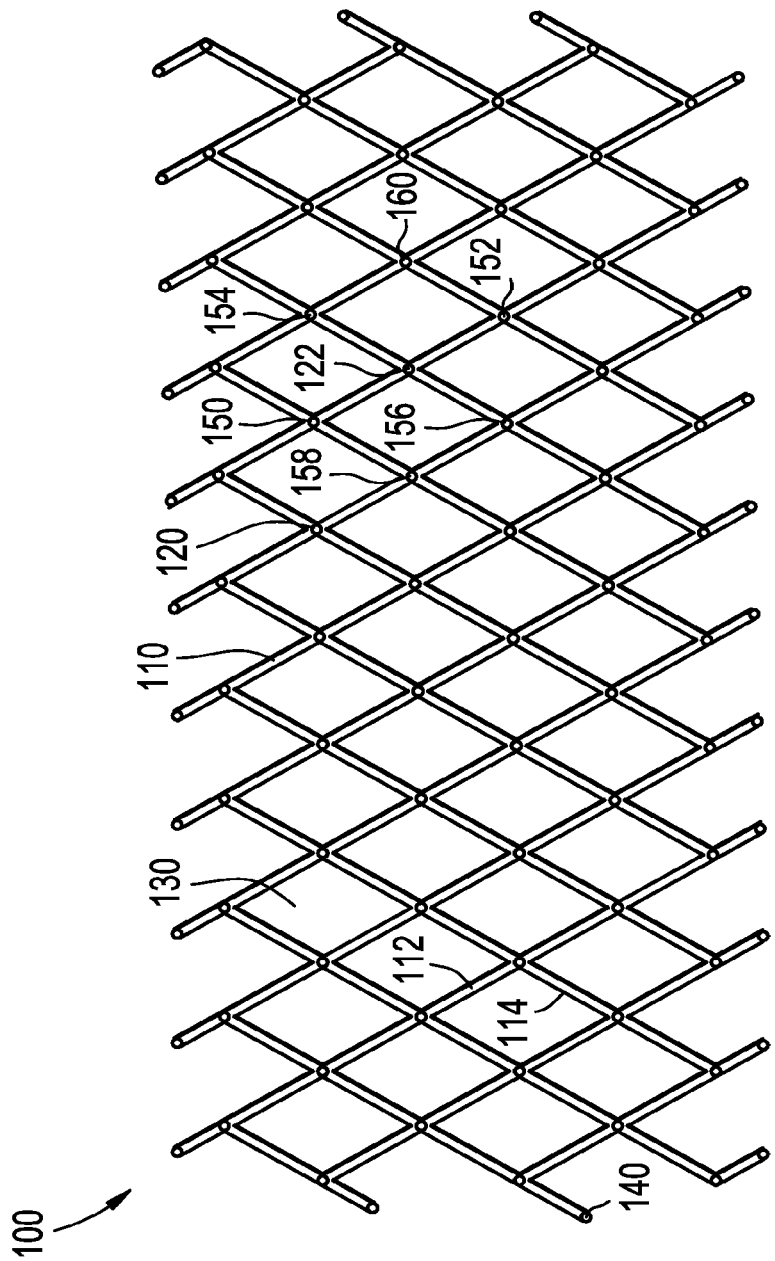
FIG. 1 depicts one embodiment of a drip irrigation system.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Embodiments disclosed herein describe systems and methods for a drip irrigation system with triangulated drip emitters configured to uniformly distribute wetting patterns. The drip irrigation system may be a unified device that is configured to be rolled, placed, positioned, etc. over a desired area, wherein the drip irrigation system may be coupled to a single water inlet and output water at a plurality of uniformly distributed drip emitters.

FIG. 1 depicts one embodiment of a drip irrigation system 100. Drip irrigation system 100 may be a unified mesh, wherein the unified mesh may be integrated into an underground automatic watering system and/or coupled directly to a spigot for manual control. The unified mesh may be rolled over a desired coverage area for efficient installation, wherein the unified mesh may be substantially pre-constructed before being placed over or below the coverage area.

Drip irrigation system 100 may be configured to conserve water and/or fertilizer by allowing water to be output slowly via drip emitters. The water may drip to the roots of plants, onto a soil surface, or directly onto a root zone via a series of valves, drip pipes, tubing, and drip emitters. Utilizing drip irrigation system 100, a wetting pattern below drip irrigation system 100 may be uniform, such that a single contact area below drip irrigation system 100 does not receive more water than any other contact area.

Drip irrigation system 100 may be comprised of a plurality drip lines 110, drip emitters 120, contact areas 130, and connection ports 140.

Drip lines 110 may be hollowed tubes, tape, etc. configured to transport water through various means. Drip lines 110 may be configured to be positioned below a soil surface and/or on the soil surface. For example, drip lines 110 may be positioned at or below plant roots. Drip lines 110 may be comprised of various materials, including plastics, metals, etc.

In embodiments, a first set of drip lines 112 may be configured to be positioned at a downward incline, and a second set of drip lines 114 may be configured to be positioned at an upward angle. Accordingly, first set of drip lines 112 and second set of drip lines 114 may be tangential to each other, such that first set of drip lines 112 and second set of drip lines 114 may intersect each other.

Drip emitters 120 may be pressure compensating drip emitters that are configured to outlet water. The drip emitters may output a precise amount of water regardless in changes in pressure due to placement along a drip line 110 or changes in terrain. Accordingly, each of the drip emitters 120 may output the same amount of water simultaneously. To consistently output the same amount of water, drip emitters 120 may include a flexible diaphragm that regulates the water flow through the drip emitter 120. In embodiments, drip emitters 120 may be positioned at each intersection of the first set of drip lines 112 and the second set of drip lines 114.

In embodiments, a first drip emitter 122 may be positioned equidistance from each adjacent drip emitter 150, 152, 154, 156, 158, 160. More specifically, first drip emitter 122 may be equidistance to the previous drip emitter 150 on the first drip line 112, the next drip emitter 152 on the first drip line 112, the previous drip emitter 154 on the second drip line 114, the next drip emitter 156 on the second drip line 124, a first and second adjacent drip emitters 158, 160 on adjacent drip lines 110. Accordingly, each of the six most adjacent drip emitters may be positioned equidistant from first drip emitter 122. In embodiments, the distance between each of the drip emitters 120 may be between six inches and twenty-four inches.

In embodiments, the vertical offset between first drip emitter and drip emitters 150, 152, 154, and 156 may be eighty six percent of the linear distance between the drip emitters. The vertical offset may be due to the triangulation of the sets of drip emitters, the angle positioning of the first drip lines 112 and the second drip line 114, as well as the linear distance between the drip emitters 120.

Accordingly, the vertical offset between the drip emitters 120 may allow each of the drip emitters 120 to be equidistant from one another via triangulation, which form equilateral triangles.

Contact areas 130 may be positions within drip irrigation system 100 to place plant materials. An installer using drip irrigation system 100 may utilize the contact areas 130 as a template of where to position plant material. Contact areas 130 may be defined as the area between upper and lower first drip lines 112, and upper and lower second drip lines 114. Accordingly, the boundaries of contact areas 130 may be pairs of parallel drip lines 110. Furthermore, each contact area 130 may be comprised of two equilateral triangles, wherein the equilateral triangles share a side extending from first drip emitter 122 with a horizontally aligned drip emitter 158 or 160.

Because the drip emitters 120 within drip irrigation system 100 are equidistance from another, each contact area 130 may receive substantially the same amount of water. Furthermore, each point within the contact areas 130 may receive substantially the same amount of water. This is because the aggregate distance from each point within the contact area 130 to the proximate drip emitters 120 may be substantially the same.

Connection ports 140 may be a triangulating drip mesh fitting that are configured to achieve triangular distribution of drip emitters 120. Connection ports 140 may be configured to be retrofitting with existing drip lines 110, wherein connection ports 140 may form the perimeter of drip irrigation system 100. If a connection port 140 is at a boundary or edge of drip irrigation system 100, a cap may be positioned on the end such that water does not exit drip irrigation system 100 out of the end.

In embodiments, connection ports 140 may be configured to couple drip lines 110 together to form a uniform distribution pattern. Each of the connection ports 140 may include a first end 142, a second end 144, and an angled end 146. A first angle may be created between first end 142 and angled end 146, and a second angle may be created between second end 144 and angled end 146. The first angle and the second angle may be complementary angles, wherein the first angle is half that of the second angle. In embodiments the first angle may be sixty degrees and the second angle may be one hundred twenty degrees.

Figure 2:
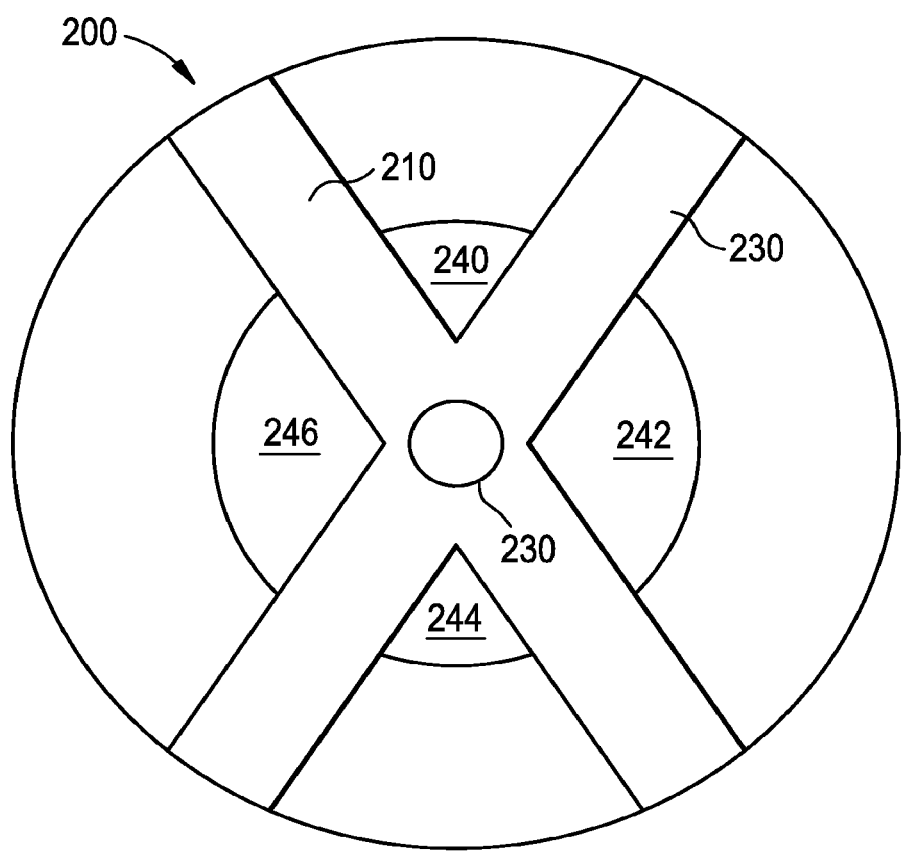
FIG. 2 depicts one embodiment of a subsection of a drip irrigation system.

FIG. 2 depicts one embodiment of a subsection 200 of drip irrigation system 100. Subsection 200 may include a first drip line 210, a second drip line 220, and drip emitter 230.

A drip emitter may be positioned at the intersection of first drip line 210 and second drip line 220. Additionally, the intersection of first drip line 210 and second drip line 220 may form four angles, 240, 242, 244, 246, wherein adjacent angles may be complementary to one another. For example, first angle 240 may be complementary with second angle 242 and fourth angle 246, and third angle 244 may be complementary with second angle 242 and fourth angle 146. In embodiments, the first angle 240 and the third angle 244 may be sixty degrees, and the second angle 242 and the fourth angle 246 may be one hundred and twenty degrees.

The angles 240, 242, 244, and 246 may be utilized because a cross-section of second angle 242 and fourth angle 246 may form sixty degree angles. Via the cross-section, a triangle formed by first angle 242 and a cross-section of second angle 242 may form an equilateral triangle. Because equilateral triangles have sides with equal lengths, the distances between each of the intersections of two adjacent drip lines will be equal. This may include the distances between drip emitters 230 that are horizontally aligned.

Furthermore, because the distance between each of the drip emitters is equal, the row spacing may be determined distance based on triangulation. The row spacing may be equal to 0.86 the length between drip emitters. This may be due to the fact that the altitude or height of any side of an equal lateral triangle is equal to half the square root of three multiplied by the length of the side of the triangle.

Accordingly, at each subsection 200 of drip irrigation system 100 the pairs of complementary angles will include a sixty degree angle and a one hundred twenty degree angle. These pairs of complementary angles at each subsection 200 may achieve triangulation of drip emitters 230 positioned at each subsection 200. The true triangulation of drip emitters 230 may uniformly distribute wetting patterns, which may reduce the need to overwater to water areas further away from dip emitters.

Figure 3:
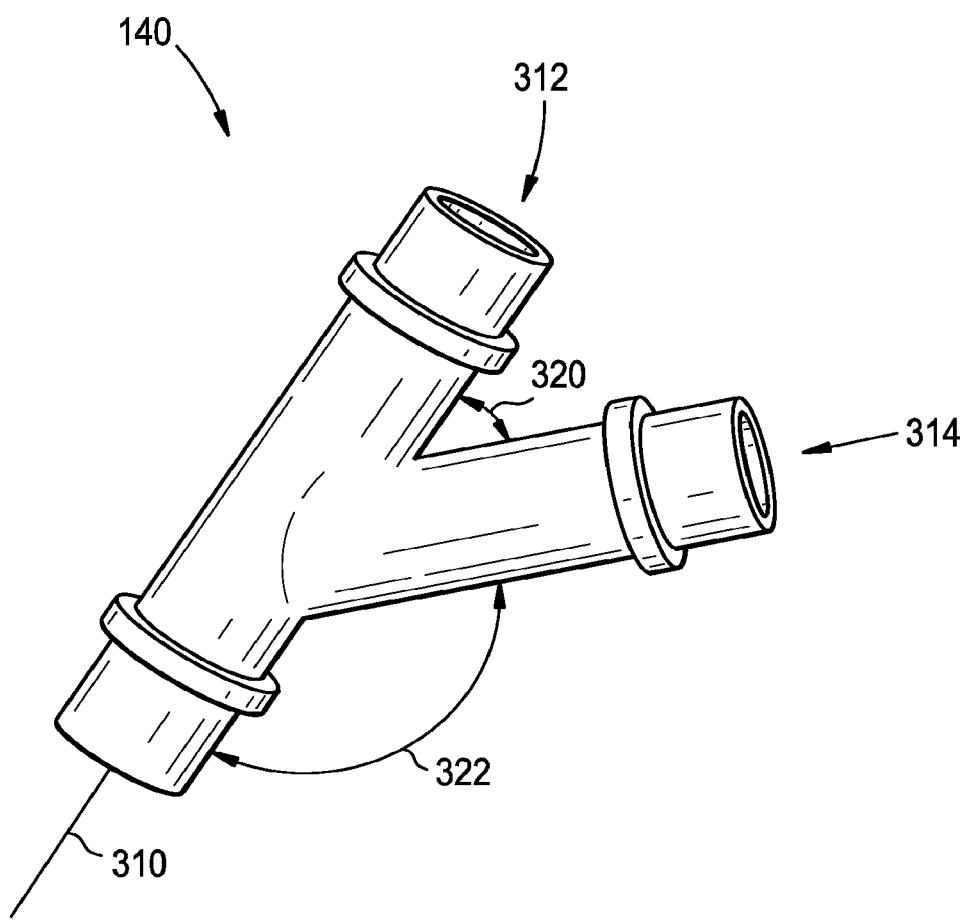
FIG. 3 depicts one embodiment of a connection port.

FIG. 3 depicts one embodiment of a connection port 140. Connection ports 140 may be a triangulating drip mesh fitting that are configured to achieve triangular distribution of the drip emitters. Connection ports 140 may include a first end 310, a second end 312, and an angled end 314, wherein each end may include a corresponding orifice allowing water to enter and/or exit connection port 140.

First end 310 and second end 312 may be aligned with each other, such that there is a straight line between the ends. The straight line between first end 310 and second end 312 may be utilized as a portion of a perimeter, boundary, etc. of drip irrigation system 100. Angled end 314 may be formed by a tangential projection extending away from the line between first end 310 and second end 314.

In embodiments, a first angle 320 may be created between first end 310 and angled end 314, and a second angle 322 may be created between second end 312 and angled end 314. The first angle 320 and the second angle 322 may be complementary angles, wherein the first angle 320 is half that of the second angle 322. In embodiments the first angle 320 may be sixty degrees and the second angle 322 may be one hundred twenty degrees.

If first end 310 or second end 312 is not being used, a cap may be positioned over a corresponding end. The cap may be used on any outlet currently not being used.

Figure 4:
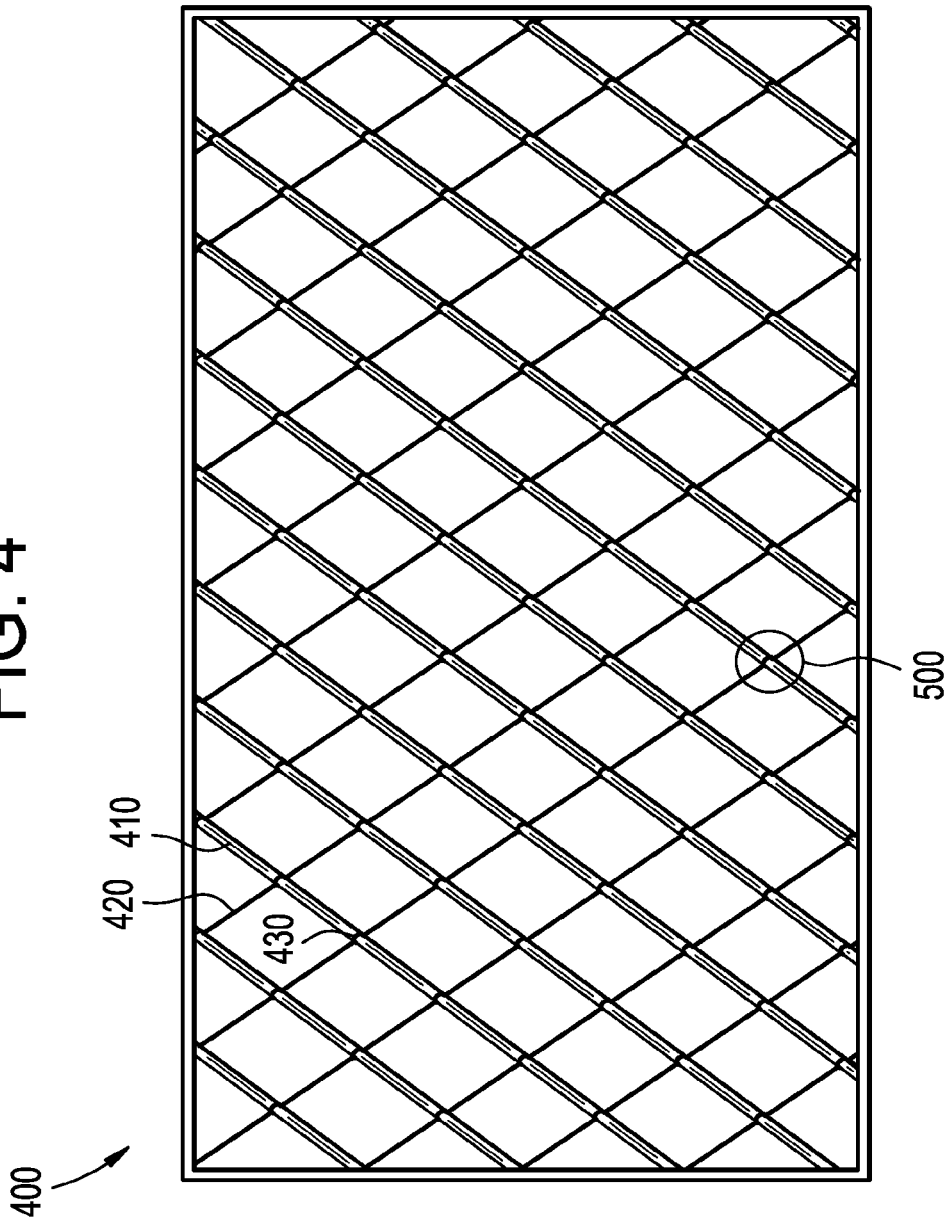
FIG. 4 depicts one embodiment of a drip irrigation system.

FIG. 4 depicts one embodiment of an alternative drip irrigation system 400. Drip irrigation system 400 may include a plurality of drip lines 410 and a plurality of plastic connectors 420. Drip lines 410 may be angled in a first direction, and plastic connectors 420 may be angled in a second direction, wherein drip lines 410 and plastic connectors are tangential to one another.

In drip irrigation system 400 instead of having drip emitters 430 positioned at the intersection of two drip lines, drip emitters 430 may be positioned at the intersection of drip lines 410 and plastic connectors 420. Accordingly, plastic connectors 420 may be used to replace a set of drip lines within drip irrigation system 400, which may reduce the amount of drip line required while maintaining the triangulation of drip emitters 430.

Figure 5:
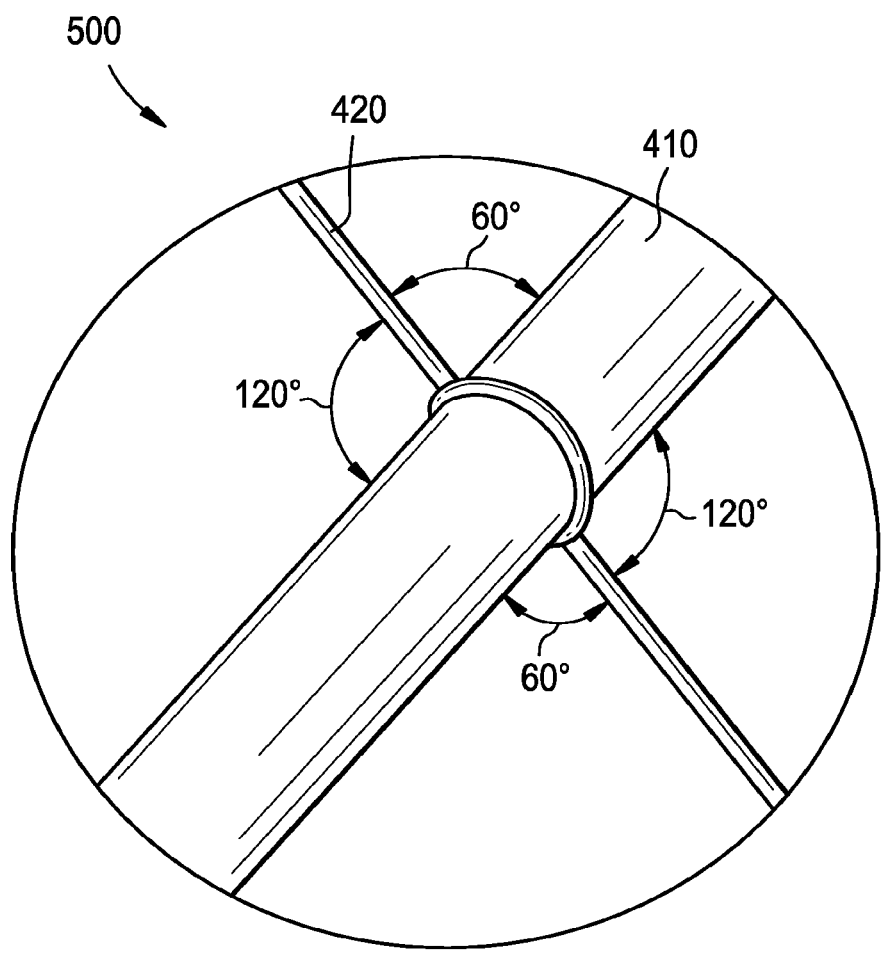
FIG. 5 depicts one embodiment of a subsection of a drip irrigation system.

FIG. 5 depicts one embodiment of a subsection 500 of drip irrigation system 400. As depicted in FIG. 5, plastic connector 420 may intersect with drip line 420 to form pairs of complementary angles, wherein a cross-section of the larger complementary may be utilized to triangulate the placement of drip emitters.

Furthermore, plastic connector 420 may be configured to encompass a circumference of drip line 410. By encompassing the circumference of drip line 410, plastic connector may maintain the mesh of drip irrigation system 400.

Figure 6:
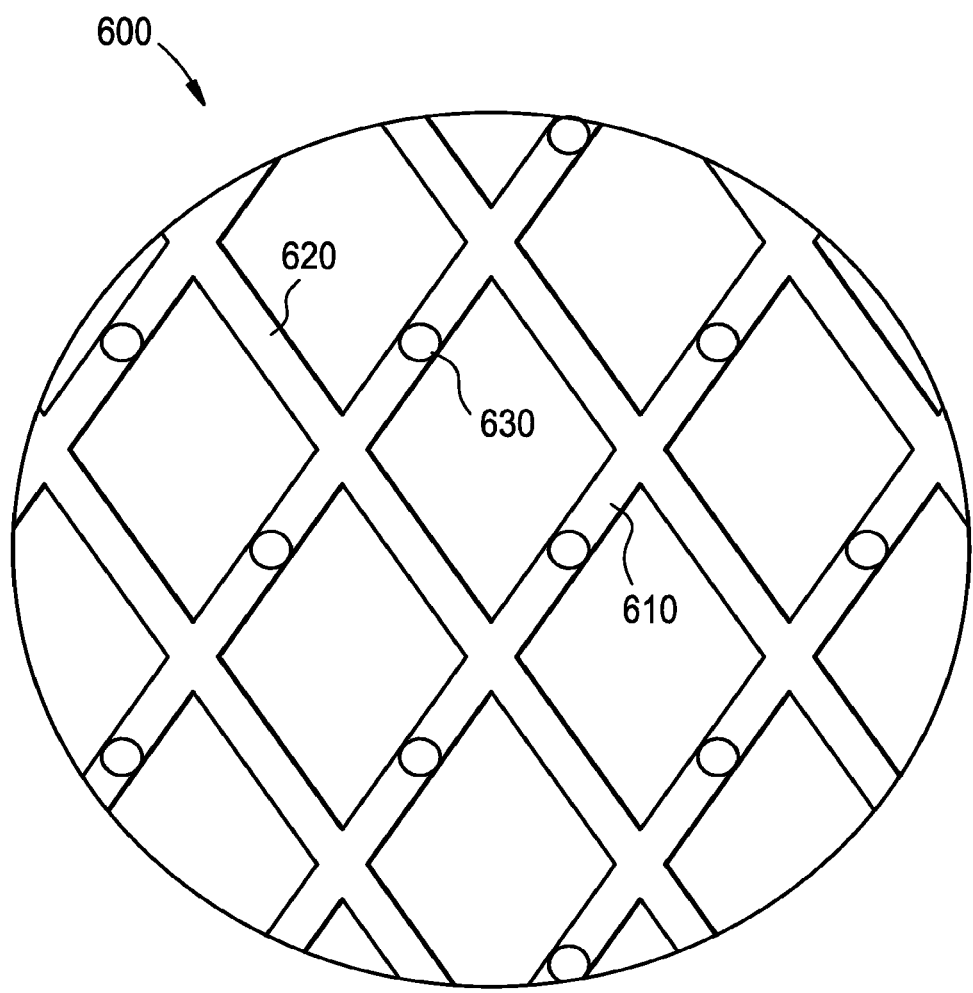
FIG. 6 depicts one embodiment of a drip irrigation system.

FIG. 6 depicts one embodiment of drip irrigation system 600. Drip irrigation system 600 may include a first set of drip lines 610, a second set of drip lines 620, and a plurality of triangulated drip emitters 630. The first set of drip lines 610 may be angled at a first angle, and the second set of drip lines 620 may be angled at a second angle, wherein the first angle is an upward angle and the second angle is a downward angle.

Drip emitters 630 may be positioned at the midway points between intersections of the first set of drip lines 610 and the second set of drip lines 620, wherein drip emitters 630 may be positioned only on the first set of drip lines 610 or the second set of drip lines 620. By positioning drip emitters 630 at even intervals at the midway of a selected drip line, then drip emitters 630 may maintain their triangulation. Accordingly, equilateral triangles may be formed between adjacent drip emitters. Thus, the distance between first drip emitter and a second drip emitter is equal to the distance between the first drip emitter and a third drip emitter, which is also equal to the distance between the second drip emitter and the third drip emitter.

Figure 7:
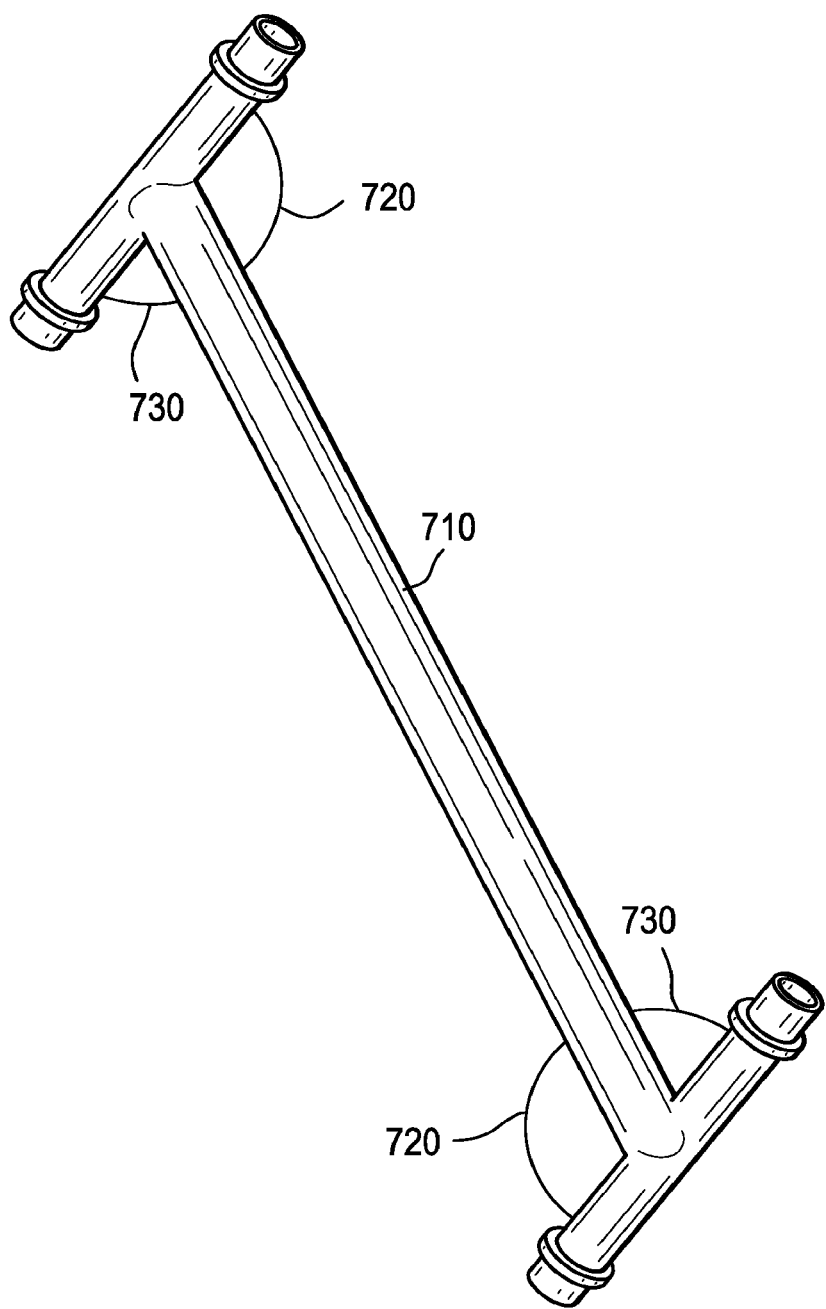
FIG. 7 depicts one embodiment of a fitting length for a drip irrigation system.

FIG. 7 depicts one embodiment of a fitting 710 for a drip irrigation system. In embodiments, fitting 710 may have a length of six inches to twenty four inches, which may be based on emitter spacing. The fitting length may be based on the emitter spacing of the drip line. Fitting 710 may be utilized in a drip line, which has two sets of complementary angles 720 and 730, wherein angle 720 may be one hundred twenty degrees and angle 730 may be sixty degrees.

Because the emitter spacing of the drip lines is equal, the length of fitting 710 may be determined distance based on triangulation of angle 730. Because the distance between the drip emitters form equilateral triangles based on angle 730, the length of fitting 710 distance may be equal to 0.86 multiplied by the emitter spacing distance.

Figure 8A:
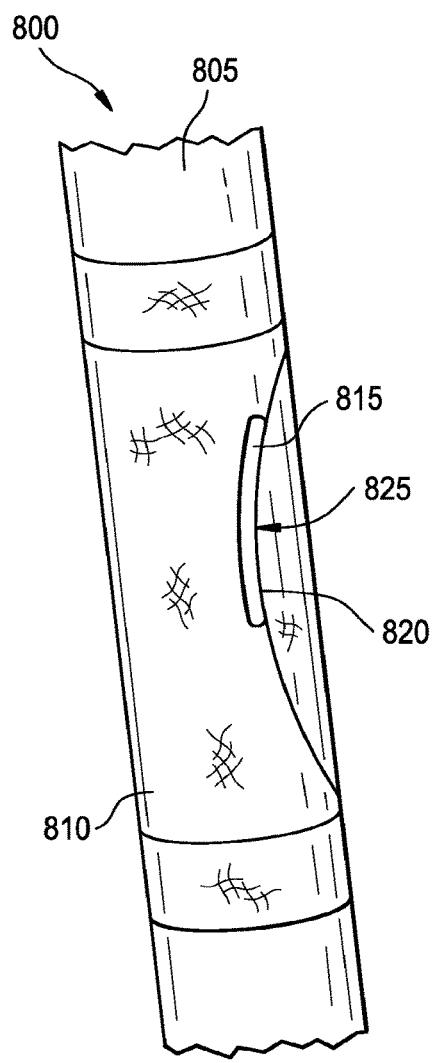
FIG. 8A depicts one embodiment of a synthetic filter fabric.
Figure 8B:
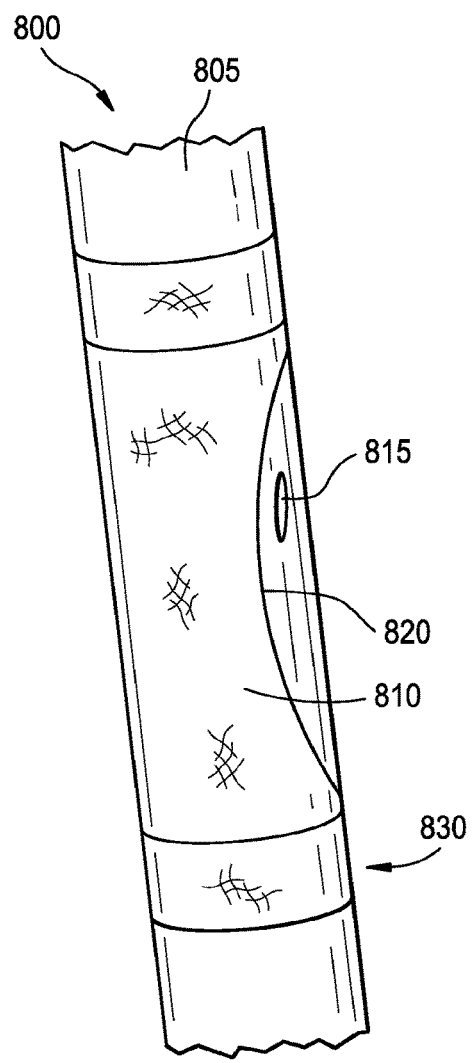
FIG. 8B depicts one embodiment of a synthetic filter fabric.

FIGS. 8A and 8B depicts one embodiment of a fabric filter 810 positioned over a drip emitter 815. Because both soil and root intrusion can clog the drip emitter 815 and the drip tubing 805, which may prevent emitters from discharging water. Synthetic Filter Fabric 810, such as Nylon, may be positioned at each drip emitter via soil and water tight adhesives 830. The synthetic filter fabric 810 may help prevent soil and root intrusion. In embodiments, the synthetic filter fabric 810 may be wrapped around the drip line 805 at the drip emitter 815, to encompass the drip line 805. The synthetic filter fabric 810 may be made up of synthetic fibers, such as Nylon, which may allow water to pass through, but not soil particles or actively growing roots.

Therefore, pores created through the weaving of the Nylon fibers may be large enough for pressurized water molecules to pass through. Yet, the pores may be small enough to prevent, limit, or reduce silt, sand, and clay particles, along with roots from passing through the pores. To this end, the synthetic filter fabric 810 may prolong the life of the drip irrigation system by preventing clogged emitters and drip tubing.

In embodiments, the synthetic filter fabric 810 may be configured to cover the drip emitter 815 at a depressed curvature 820 in a drip line 805, wherein the drip emitter 815 may be positioned at the valley of the depressed curvature 820. The synthetic filter fabric 810 may be configured to wrap around the drip line 805, such that the filter fabric has substantially the same circumference as the drip line 805, wherein the circumference caused by the depressed curvature 820 may be less than the circumference of the drip line 805 with an air gap 825 positioned between drip emitter 825 and synthetic fiber 810.

Furthermore, the filter fabric 810 may be used to form a shell around the drip tubing 805 with a reinforcement fabric fibers, such as Nylon with increased denier, Polyester, or Teflon. Fabric filter 810 may be woven into the nylon filter fabric making the drip tubing 805 more resistant to cuts, abrasions, and pinching prolonging the life of the drip tubing.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The invention claimed is:

1. A mesh drip irrigation system comprising:
    a plurality of first drip lines being configured to transport water;
    a plurality of second lines, wherein an intersection between the first drip line and the second line form a diamond mesh pattern, wherein a first set of opposite angles within the diamond are a first value, a second set of opposite angles within the diamond are a second value, and the first value does not equal the second value;
    a plurality of emitters configured to distribute water, the plurality of emitters being positioned on at least one of the plurality of first drip lines.

2. The system of claim 1, wherein the plurality of second line are second drip lines.

3. The system of claim 1, wherein the plurality of second lines are plastic lines.

4. The system of claim 1,
    wherein the plurality of first drip lines are parallel to each other; and the plurality of second lines are parallel to each other.

5. The system of claim 4, wherein the plurality of drip emitters are positioned at each intersection of the plurality of first drip lines and the plurality of second lines.

6. The system of claim 4, wherein the plurality of emitters are positioned at midway points between each intersection of the plurality of first drip lines and the plurality of second lines.

7. The system of claim 1, wherein the first value is a first angle of sixty degrees and the second value is a second angle of one hundred twenty degrees.

8. The system of claim 7, wherein a cross-section of the second angle forms a sixty degree angle, wherein the cross-section forms a shared side between a first triangulation of emitters and a second triangulation of emitters.

9. The system of claim 1, wherein the plurality of emitters are pressure compensating drip emitters including a flexible diaphragm configured to regulate a flow of water through the plurality of emitters.

10. The system of claim 1, wherein the plurality of emitters include a first drip emitter, and distances between each of the adjacent plurality of emitters to the first drip emitter that are horizontally and diagonally aligned are equal.

11. A method using a drip irrigation system, the method comprising:
    aligning a plurality of first drip lines configured to transport water in a first direction;
    aligning a plurality of second lines in a second direction,
    forming a diamond mesh pattern based on the layout of the first drip line and the second line, wherein a first set of opposite angles within the diamond are a first value, a second set of opposite angles within the diamond are a second value, and the first value does not equal the second value;
    positioning a plurality of emitters on the first drip line; and
    distributing water via the plurality of emitters.

12. The method of claim 11, wherein the plurality of second drip lines are drip lines.

13. The method of claim 11, wherein the plurality of second drip lines are plastic lines.

14. The method of claim 11, wherein each of the plurality of first drip lines are in parallel with each other, and each of the plurality of second lines are in parallel with each other.

15. The method of claim 14, further comprising:
    positioning the plurality of emitters at each intersection of the plurality of first drip lines and the plurality of second lines.

16. The method of claim 14, further comprising:
    positioning the plurality of drip at midway points between each intersection of the plurality of first drip lines and the plurality of second lines.

17. The method of claim 11, wherein the first value is a first angle of sixty degrees and the second value is a second angle of one hundred twenty degrees.

18. The method of claim 17, further comprising:
    forming a cross-section of the second angle to create two sixty degree angles;
    forming, via the cross-section, a shared side between a first triangulation of emitters and a second triangulation of emitters.

19. The method of claim 17, wherein the plurality of emitters are pressure compensating drip emitters including a flexible diaphragm, and
    regulating a flow of water through the plurality of emitters.

20. The method of claim 17, wherein the plurality of emitters include a first drip emitter, and distances between each of the adjacent plurality of emitters to the first drip emitter that are horizontally and diagonally aligned are equal.

\* \* \* \* \*